(12) United States Patent
Brian et al.

(10) Patent No.: US 10,791,001 B2
(45) Date of Patent: *Sep. 29, 2020

(54) DIAGNOSTIC TOOLS AND METHODS OF SERVICING CONSUMER APPLIANCES

(71) Applicant: Haier US Appliance Solutions, Inc., Wilmington, DE (US)

(72) Inventors: Joseph Mark Brian, Louisville, KY (US); Richard Dean Suel, II, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/879,571

(22) Filed: Jan. 25, 2018

(65) Prior Publication Data

US 2019/0229944 A1  Jul. 25, 2019

(51) Int. Cl.

| | | |
|---|---|---|
| *G06F 15/173* | (2006.01) | |
| *H04L 12/28* | (2006.01) | |
| *H04W 4/70* | (2018.01) | |
| *H04W 4/38* | (2018.01) | |
| *H04L 29/08* | (2006.01) | |
| *H04L 29/06* | (2006.01) | |
| *H04L 12/46* | (2006.01) | |

(52) U.S. Cl.
CPC ...... *H04L 12/2827* (2013.01); *H04L 12/2812* (2013.01); *H04L 12/4625* (2013.01); *H04L 67/025* (2013.01); *H04L 67/12* (2013.01); *H04L 67/34* (2013.01); *H04L 67/42* (2013.01); *H04W 4/38* (2018.02); *H04W 4/70* (2018.02); *H04L 2012/285* (2013.01)

(58) Field of Classification Search
CPC ............. H04L 12/2812; H04L 12/2827; H04L 12/4625; H04L 41/0253; H04L 41/0803; H04L 41/082; H04L 41/145; H04L 41/22; H04L 41/5041; H04L 41/5096; H04L 67/025; H04L 67/12; H04L 67/16; H04L 67/34; H04L 67/42
USPC ................................ 709/219–220, 224, 226
See application file for complete search history.

(56) References Cited

U.S. PATENT DOCUMENTS

| | | |
|---|---|---|
| 7,739,078 B2 | 6/2010 | Ferchau |
| 8,040,234 B2 | 10/2011 | Ebrom et al. |
| 8,155,120 B2 | 4/2012 | McCoy et al. |
| 8,402,376 B2 | 3/2013 | Argue et al. |
| 8,680,983 B2 | 3/2014 | Ebrom et al. |
| 9,225,766 B2 | 12/2015 | Philip et al. |

(Continued)

*Primary Examiner* — Farzana B Huq
(74) *Attorney, Agent, or Firm* — Dority & Manning, P.A.

(57) ABSTRACT

A diagnostic tool and method of servicing a consumer appliance is provided herein. The diagnostic tool may include a casing and a controller. The casing may be spaced apart from the consumer appliance. The controller may be selectively connected to the consumer appliance. The controller may be configured to direct a service operation. Moreover, the service operation may include receiving non-functional character data from the consumer appliance at the diagnostic tool, assigning an appliance configuration manifest to the consumer appliance based on the received non-functional character data, determining a service action based on the appliance configuration manifest, and initiating the determined service action at the diagnostic tool.

13 Claims, 3 Drawing Sheets

(56) References Cited

U.S. PATENT DOCUMENTS

| | | | |
|---|---|---|---|
| 2004/0204780 A1* | 10/2004 | Boyer | G05B 23/0272 |
| | | | 700/83 |
| 2005/0091346 A1 | 4/2005 | Krishnaswami et al. | |
| 2007/0160022 A1 | 7/2007 | McCoy et al. | |
| 2010/0131241 A1* | 5/2010 | Dal Bello | G05B 23/02 |
| | | | 702/185 |
| 2011/0218957 A1* | 9/2011 | Coon | G06Q 30/0601 |
| | | | 706/54 |
| 2012/0173857 A1 | 7/2012 | Kobraei et al. | |
| 2017/0176296 A1* | 6/2017 | Gary, Jr. | G06Q 10/20 |

* cited by examiner

DIAGNOSTIC TOOLS AND METHODS OF SERVICING CONSUMER APPLIANCES

FIELD OF THE INVENTION

The present subject matter relates generally to consumer appliances and, more particularly, to features and methods for servicing or diagnosing consumer appliances.

BACKGROUND OF THE INVENTION

Consumer appliances, such as refrigerator appliances, oven appliances, microwave appliances, dishwasher appliances, etc., generally include one or more components for directing operation of a given consumer appliance. For example, a consumer appliance may include a controller having a printed circuit board and memory that is connected to a control pad. Through programmed instructions and input from the control pad, the controller may work with the other components of the appliance to direct operations thereof.

In order to service multiple and varied consumer appliances, it is often important to uniquely identify each consumer appliance. Certain functions may be common to multiple different models, but different models may also have functions that are not common between them. In other words, there may be a number of variations between different consumer appliances of the same type (e.g., two or more refrigerator appliance models). Between different types of consumer appliances (e.g., a refrigerator appliance model and an oven appliance model), even more variations may exist. Over time, even identical models of a consumer appliance (e.g., appliances having the same model number) may have variations between them (e.g., different versions of software installed on the controller of each respective consumer appliance). Each of these variations may or may not influence how a service professional can interact with a given consumer appliance. In some circumstances, certain variations will change how the service professional can interact with the given appliance, while other variations will not. For instance, different interfaces or sets of service options from a diagnostic tool may be appropriate based on certain variations. A common interface or set of service options may be appropriate based on other variations.

Given the large and ever-changing pool of consumer appliances that a service professional may need to service, uniquely identifying each consumer appliance can be especially difficult. Existing systems typically rely on exhaustive databases of specific model identifiers (e.g., model numbers). Such databases can be cumbersome and difficult to maintain. Moreover, the databases may fail to account for changes to individual appliances that share a common model (e.g., updates or repairs that may be made to one consumer appliance of a certain model number, but not to another consumer appliance of the same model number).

Therefore, further improvements to methods and diagnostic tools for servicing consumer appliances are necessary. In particular, it would be advantageous to provide methods and tools that can uniquely identify an appliance, yet do not require reliance on, or determination of, a single preset model number.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of servicing a consumer appliance is provided. The method may include receiving non-functional character data from a control board of the consumer appliance at a diagnostic tool selectively connected to the control board. The method may also include assigning an appliance configuration manifest to the consumer appliance based on the received non-functional character data. The method may further include determining a service action based on the appliance configuration manifest. The method may still further include initiating the determined service action at the diagnostic tool.

In another exemplary aspect of the present disclosure, a diagnostic tool for a consumer appliance having a control board is provided. The diagnostic tool may include a casing and a controller. The casing may be spaced apart from the consumer appliance. The controller may be selectively connected to the control board of the consumer appliance and configured to direct a service operation. The service operation may include receiving non-functional character data from the control board of the consumer appliance at the diagnostic tool, assigning an appliance configuration manifest to the consumer appliance based on the received non-functional character data, determining a service action based on the appliance configuration manifest, and initiating the determined service action at the diagnostic tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
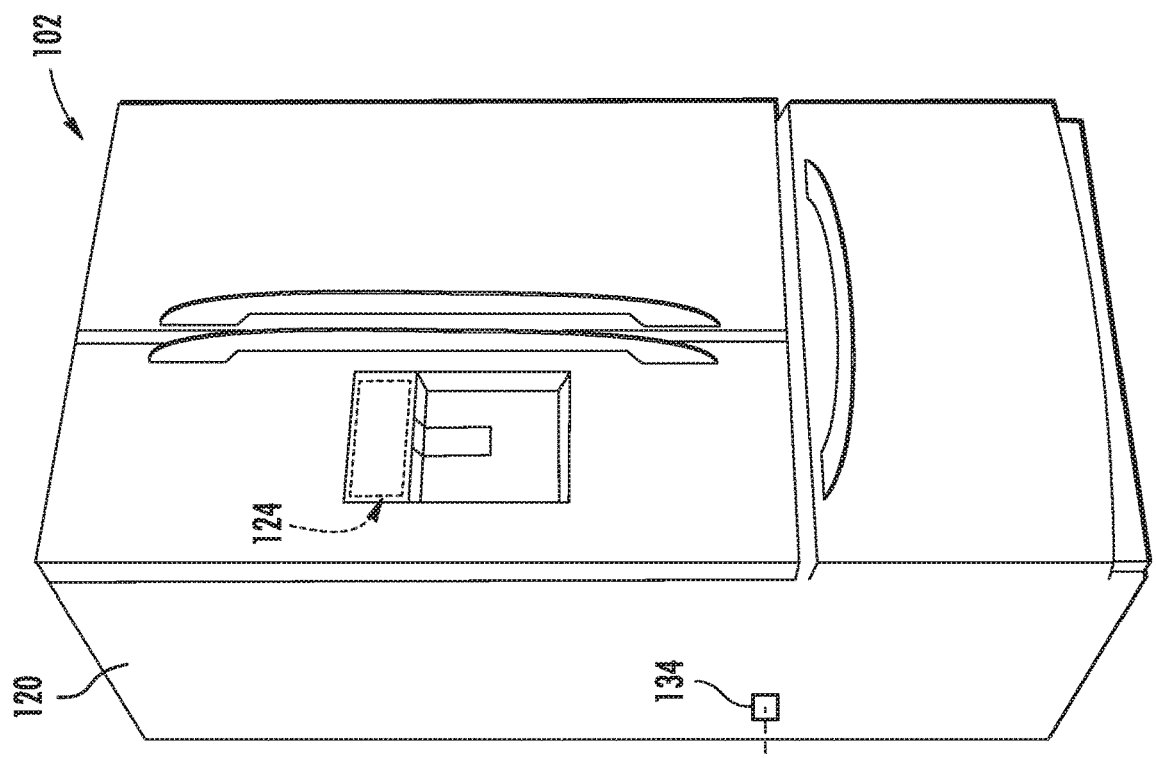
FIG. 1 provides a schematic view of a servicing system according to exemplary embodiments of the present disclosure.
Figure 1:
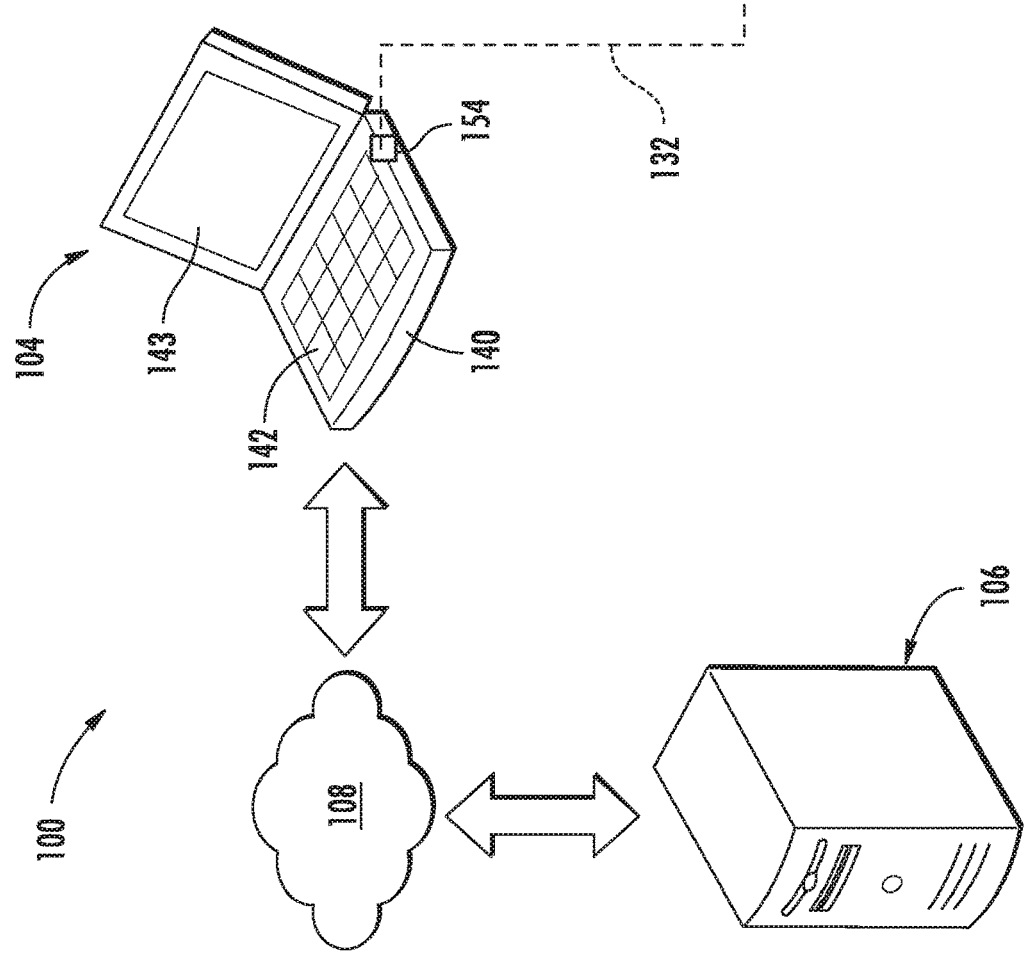

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
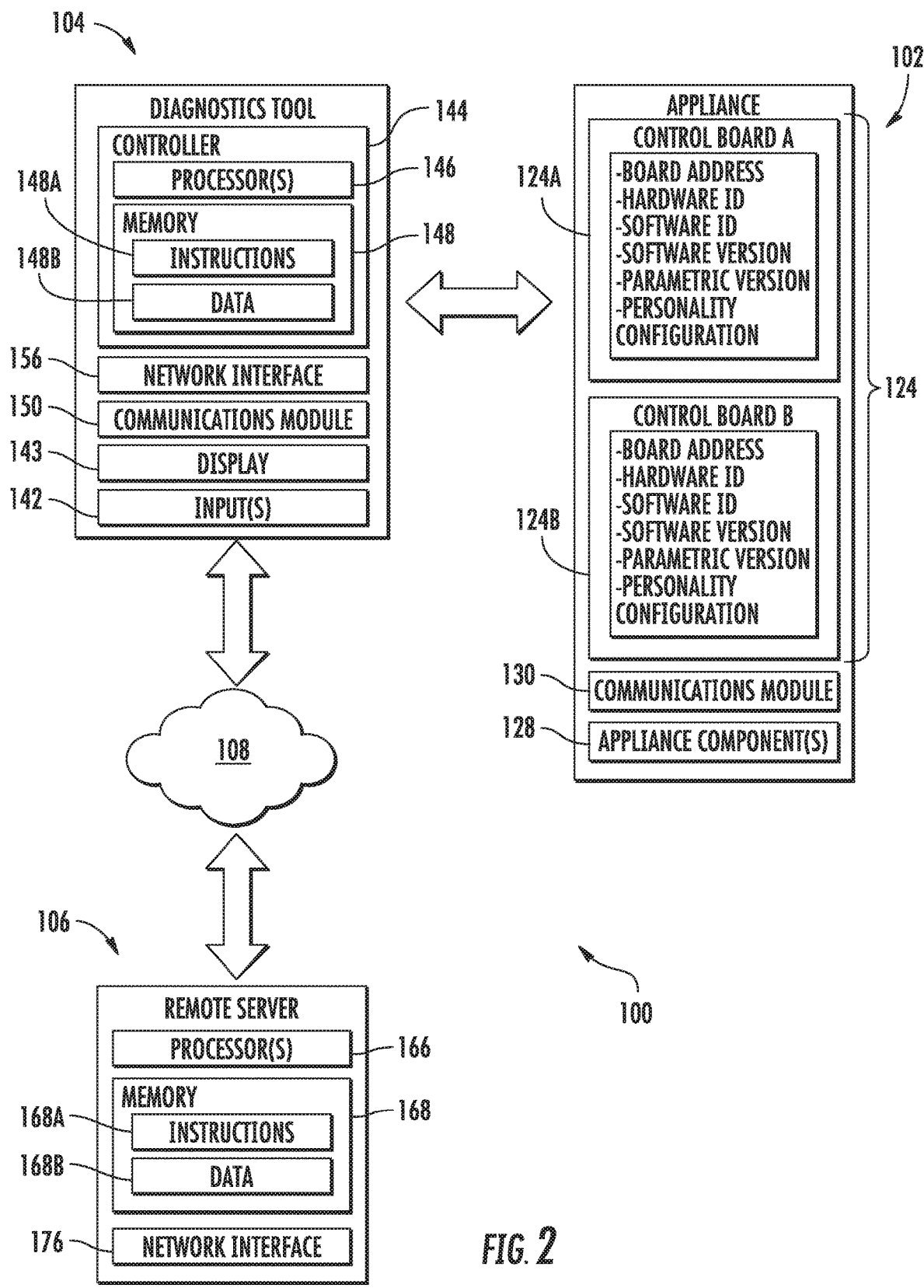
FIG. 2 provides a further schematic view of a servicing system according to exemplary embodiments of the present disclosure.

Turning now to the figures, FIGS. 1 and 2 provide different schematic views of a servicing system 100 according to exemplary embodiments of the present disclosure. Generally, it is understood that such systems may be utilized to service (e.g., test, update, diagnose, debug, etc.) a consumer appliance 102. In particular, a diagnostic tool 104 and a remote server 106 may be permitted to communicate with consumer appliance 102 in order to aid or facilitate one or more service operations, as will be described in detail below. Moreover, as shown, diagnostic tool 104 can be communicatively coupled with a network 108 and various nodes coupled with the network 108, such as a remote server 106. Additionally or alternatively, although network 108 is shown, diagnostic tool 104 may not be communicatively coupled via network 108; rather, diagnostic tool 104 can be communicatively coupled via a suitable wired or wireless means not over network 108, such as, for example, via physical wires, transceiving, transmitting, or receiving components. The communicative coupling may establish a constant or intermittent connection between diagnostic tool 104 and network 108. For instance, if the connection is intermittent, diagnostic tool 104 may continue to operate "offline" such that data or information gathered during a break in the connection may be transmitted after the connection is reestablished.

It is noted that although consumer appliance 102 is shown as a refrigerator appliance, additional or alternative embodiments may provide a different consumer appliance (e.g., different type of appliance), such as an oven appliance, microwave appliance, dishwasher appliance, washing machine appliance, dryer appliance, or any other suitable consumer appliance.

As would be understood, consumer appliance 102 generally includes a cabinet 120 and one or more appliance components 128 (e.g., compressor, heating element, motor, air blower, etc.) attached thereto for performing the predetermined functions of the consumer appliance 102 (e.g., cooling, heating, etc.). Such appliance components 128 are assembled in communication with a corresponding appliance controller 124 that is, for example, mounted on or within cabinet 120 of consumer appliance 102). Along with appliance components 128, appliance controller 124 may be in communication with one or more sensors (e.g., temperature sensors, pressure sensors, accelerometers, gyroscopes, etc.) attached to or within cabinet 120 for detecting certain corresponding conditions (e.g., temperature, pressure, acceleration, rotation, etc.) of consumer appliance 102 and permitting appliance controller 124 to record one or more log sets of such conditions.

Appliance controller 124 generally includes one or more control boards [e.g., a first control board 124A (Control Board A) and a second control board 124B (Control Board B)]. Each control board 124A and 124B may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions that are executed by the processor to cause consumer appliance 102 to perform various operations. For example, instructions could be instructions for directing activation of one or more appliance components 128. Instructions could further be for receiving/transmitting log data signals (e.g., signals corresponding to performance or of the consumer appliance 102, such as temperature, pressure, speed, rotation, or activation/deactivation history of appliance components 128), recording log data as one or more log data sets over time (e.g., within memory), etc.

In some embodiments, one or more of the control boards 124A, 124B include (e.g., within the memory) certain non-functional character data relating to the corresponding control board 124A or 124B. In particular, the non-functional character data includes information regarding attributes of the control board 124A or 124B that do not directly relate to (e.g., are not descriptive of) the purpose or functionality of the consumer appliance 102. Moreover, in contrast to a stored model number of the consumer appliance 102, the non-functional character data may pertain to the control board 124A or 124B itself, and not overall assembled consumer appliance 102.

As an example, the non-functional character data may include component identification information of the control board 124A or 124B, such as a board address number (e.g., provided in hexadecimal form), hardware identifier of the control board 124A or 124B, or image identifier relating to software preprogrammed on control board 124A or 124B (e.g., the type of software, which corresponds to the type of consumer appliance 102 to be controlled). As an additional or alternative example, the non-functional character data may include software version information (e.g., the version or iteration number of the software programmed on control board 124A or 124B). As yet another additional or alternative example, the non-functional character data may include parametric version information (e.g., the version or iteration number of parametric data stored on control board 124A or 124B to facilitate software execution). As still another additional or alternative example, the non-functional character data may include personality configuration information (e.g., one or more programmed settings specifying which portion or package of the software is to be executed).

As will be described in greater detail below, one or more elements of non-functional data (e.g., a plurality of non-functional data elements) may be collected and used to determine an appliance configuration manifest (ACM). Advantageously, the ACM may account for variations in multiple consumer appliances that do and do not influence service operations without trying to specifically identify each unique model of consumer appliance that may be connected to or serviced by diagnostic tool 104.

Appliance controller 124 includes one or more communications modules 130 such that consumer appliance 102 can selectively connect to and communicate with diagnostic tool 104 (e.g., over one or more conductive signal lines, shared communication busses, or wireless communications bands). In certain embodiments, conductive transmission lines 132, such as wires, extend between consumer appliance 102 and diagnostic tool 104 in connection therewith. Communications module 130 can be an onboard component of appliance controller 124 or it can be a separate, off board component. In some embodiments, communications module 130 includes or is joined to an RJ45 terminal 134 on cabinet 120. When connected to the diagnostic tool 104, the RJ45 terminal 134 on cabinet 120 may thus be positioned between appliance controller 124 and diagnostic tool 104.

As illustrated in FIG. 1, diagnostic tool 104 generally includes a casing 140 spaced apart from consumer appliance 102 (e.g., when connected thereto). In some embodiments, a user interface is provided on (e.g., mounted or attached to) casing 140. As indicated in FIGS. 1 and 2, user interface generally includes one or more control inputs 142, such as one or more of a variety of electrical, mechanical, or electro-mechanical input devices. Control inputs 142 may include, for example, rotary dials, knobs, push buttons, and touch pads. A controller 144 is in communication with user interface 142 and control inputs 142 through which a user (e.g., service professional) may select various operational features and modes for diagnostic tool 104 or consumer appliance 102 (e.g., when connected thereto). User interface may further include a display component 143, such as a digital or analog display in communication with controller 144 and configured to provide operational feedback to a user or service professional. In particular, the display component 143 may be configured to present or display a graphical user interface (GUI) programmed into controller 144. As will be described in greater detail below, multiple GUIs may be provided within each controller 144. The GUI that is presented or displayed at any given moment may be based at least in part on the ACM of the appliance to which diagnostic tool 104 is connected (e.g., consumer appliance 102). In certain embodiments, user interface, including control inputs 142, represents or includes a general purpose I/O ("GPIO") device or functional block.

Controller 144 may include one or more processors 146 and one or more memory devices 148 (i.e., memory). The one or more processors 146 can be any suitable processing device (e.g., a processor core, a microprocessor, an ASIC, a FPGA, a microcontroller, etc.) and can be one processor or a plurality of processors that are operatively connected. The memory device 148 can include one or more non-transitory computer-readable storage mediums, such as RAM, ROM, EEPROM, EPROM, flash memory devices, magnetic disks, etc., and combinations thereof. The memory devices 148 can store data 148B and instructions 148A that are executed by the processors 146 to cause diagnostic tool 104 to perform operations. For example, instructions 148A could be instructions 148A for executing or directing a service operation (e.g., presenting a suitable GUI, executing one or more parser algorithms, etc.), receiving/transmitting signals to/from consumer appliance 102, receiving/transmitting signals to/from remote server 106. The memory devices 148 may also include data 148B, such as a one or more GUI files, ACMs, software installation files, etc. that can be retrieved, manipulated, created or stored by processors 146.

Controller 144 includes a communications module 150 such that diagnostic tool 104 can selectively connect to and communicate with consumer appliance 102 (e.g., over one or more transmission lines 132, shared communication busses, wireless communications bands, etc.). Communications module 150 can be an onboard component of controller 144 or it can be a separate, off board component. In some embodiments, communications module 150 includes or is joined to a communications terminal 154 on casing 140 (e.g., such that terminal 154 is formed directly on casing 140 or held in attachment on casing 140 by an intermediate adapter). Generally, communications terminal 154 may include, or be provided as, any suitable transceiving terminal (e.g., USB, RJ45, etc.). When connected to the consumer appliance 102, the communications terminal 154 on casing 140 may thus be positioned between controller 144 and appliance controller 124. In some embodiments, a conductive transmission line 132 may be selectively joined to and removed from the communications terminal 154 on casing 140 or the RJ45 terminal 134 on cabinet 120 (e.g., to selectively connect and disconnect controller 144 and appliance controller 124).

In some embodiments, controller 144 includes a network interface 156 such that diagnostic tool 104 can connect to and communicate over one or more networks (e.g., network 108) with one or more network nodes. Network interface 156 can be an onboard component of controller 144 or it can be a separate, off board component. Controller 144 can also include one or more transmitting, receiving, or transceiving components for transmitting/receiving communications with other devices communicatively coupled with diagnostic tool 104. Additionally or alternatively, one or more transmitting, receiving, or transceiving components can be located off board for controller 144.

Network 108 can be any suitable type of network, such as a local area network (e.g., intranet), wide area network (e.g., internet), low power wireless networks [e.g., Bluetooth Low Energy (BLE)], cellular network (e.g., GSM, CDMA, etc.), or some combination thereof and can include any number of wired or wireless links. In general, communication over network 108 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 106, such as a web server, is in operable communication with diagnostic tool 104. The remote server 106 can be used to host a service platform or cloud-based application. Additionally or alternatively, remote server 106 can be used to host an information database (e.g., of ACMs, GUI files, recorded log data, or other relevant service data). Remote server 106 can be implemented using any suitable computing device(s). Remote server 106 may include one or more processors 166 and one or more memory devices 168 (i.e., memory). The one or more processors 166 can be any suitable processing device (e.g., a processor core, a microprocessor, an ASIC, a FPGA, a microcontroller, etc.) and can be one processor or a plurality of processors that are operatively connected. The memory device 168 can include one or more non-transitory computer-readable storage mediums, such as RAM, ROM, EEPROM, EPROM, flash memory devices, magnetic disks, etc., and combinations thereof. The memory devices 168 can store data 168B and instructions 168A which are executed by the processors 166 to cause remote server 106 to perform operations. For example, instructions 168A could be instructions 168A for receiving/transmitting files related to one or more ACMs, GUIs, log data, etc.

The memory devices 168 may also include data 168B, such as ACMs, GUI files, log data, etc., that can be retrieved, manipulated, created, or stored by processors 166. The data 168B can be stored in one or more databases. The one or more databases can be connected to remote server 106 by a high bandwidth LAN or WAN, or can also be connected to remote server 106 through network 108. Optionally, the one or more databases can be split up so that they are located in multiple locales.

Remote server 106 includes a network interface 176 such that interactive remote server 106 can connect to and communicate over one or more networks (e.g., network 108) with one or more network nodes. Network interface 176 can be an onboard component or it can be a separate, off board component. In turn, remote server 106 can exchange data with one or more nodes over the network 108. In particular, remote server 106 can exchange data with diagnostic tool 104. Although not pictured, it is understood that remote server 106 may further exchange data with any number of client devices over the network 108. The client devices can be any suitable type of computing device, such as a general purpose computer, special purpose computer, laptop, desktop, integrated circuit, mobile device, smartphone, tablet, or another suitable computing device. Information or signals (e.g., relating to ACMs, GUIs, log data, etc.) may thus be exchanged between diagnostic tool 104 and various separate client devices through remote server 106.

Figure 3:
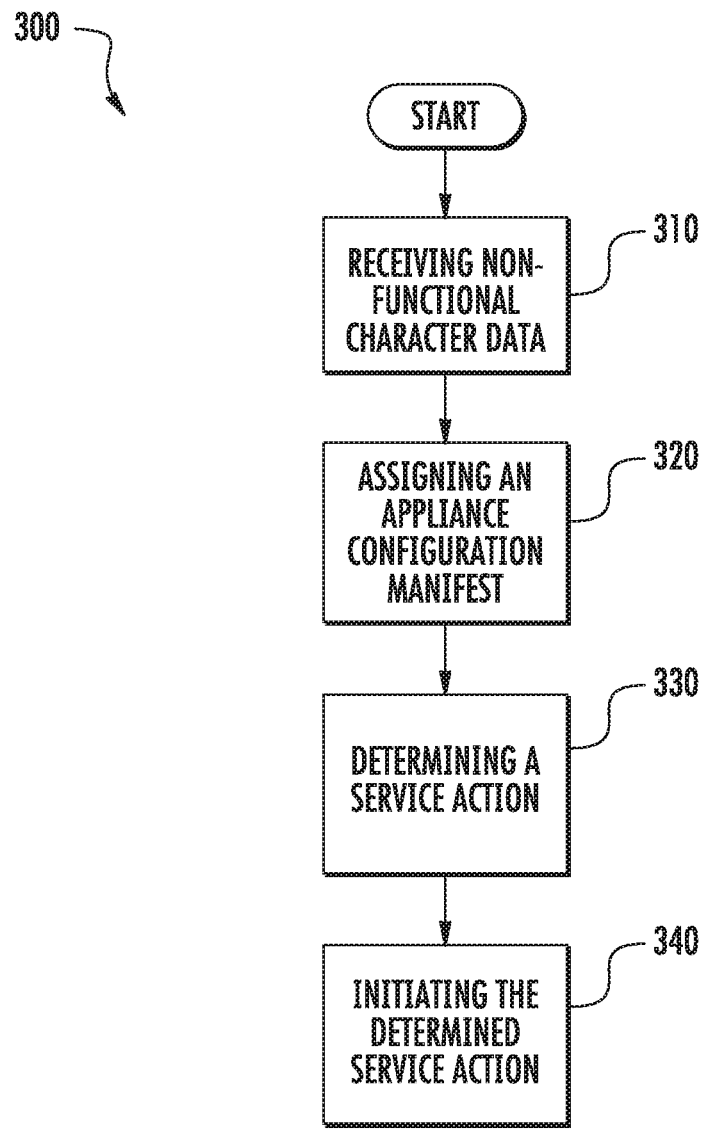
FIG. 3 provides a flow chart illustrating a method of servicing a consumer appliance according to exemplary embodiments of the present disclosure.

Referring now to FIG. 3, various methods (e.g., method 300) may be provided for use with system 100 in accordance with the present disclosure. In general, the various steps of methods as disclosed herein may, in exemplary embodiments, be performed by the controller 144 as part of an operation that the controller 144 is configured to initiate (e.g., a service operation). During such methods, controller 144 may receive inputs and transmit outputs from various other portions of the system 100. For example, controller 144 may send signals to and receive signals from remote server 106, consumer appliance 102, as well as other suitable components. The present methods may advantageously permit identification and service of multiple different consumer appliances and types of consumer appliances without the need to maintain an exhaustive list of each unique consumer appliance 102. Moreover, such methods may advantageously permit the improved and reduced transfer of data (e.g., to/from consumer appliances, diagnostic tools, or remote servers).

FIG. 3 depicts steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure.

At 310, the method 300 includes receiving non-functional character data. In particular, the non-functional character data may be received at the diagnostic tool from one or more control boards of the consumer appliance. Thus, the diagnostic tool may be selectively connected to the control board of the consumer appliance, as described above (e.g., through one or more RJ45 terminals and communications modules). As also described above, the non-functional character data may include component identification information. Additionally or alternatively, the non-functional character data may include a control board address, a hardware identifier of a control board, an image identifier relating to software preprogrammed on a control board, software version information, parametric version information, or personality configuration information. In certain embodiments, a plurality of non-functional data elements is collected. Thus, diagnostic tool may direct the consumer appliance to transmit multiple unique non-functional data elements, such as several or all elements chosen from a control board address, a hardware identifier of a control board, an image identifier relating to software preprogrammed on a control board, software version information, parametric version information, or personality configuration information.

At 320, the method 300 includes assigning an appliance configuration manifest (ACM) to the consumer appliance based on (e.g., as a direct function of) the received non-functional character data at 310. Between discrete consumer appliance models, differences in the appliances may alter the ACM that is assigned. Assigning an ACM may thus provide a suitable identifier for the consumer appliance that is not programmed or stored on the appliance controller. For instance, an ACM code may be organized as a string or sequence of characters (e.g., numbers). Optionally, each position on the sequence of characters may correspond to a different non-functional character element. As an example, the first position or entry of a sequence of characters for an ACM may be reserved for a value related to the board address.

The value of a character at a specific sequence position may be tied to the non-functional character element. Thus, differences between each non-functional character element may correspond to a different value at the specific sequence position. One board address may cause one value at the specific sequence position while another board address may cause another value at the specific sequence position. As a result, different board addresses may result in different character values for a specific sequence position.

In some embodiments, the assigned ACM is matched to an ACM (e.g., stored ACM) from a plurality of predetermined ACMs. As a result, the ACM at 320 may be one of a plurality of predetermined appliance configuration manifests, which may identify the consumer appliance (e.g., type of consumer appliance, series of consumer appliance, specific model of consumer appliance, etc.). Optionally, the plurality of ACMs may be stored within the memory of the diagnostics tool or may be received from the memory of the remote server. If the ACM is a new ACM and cannot be matched to one of the plurality of ACMs, an alert signal may be transmitted (e.g., from the diagnostic tool to the remote server). In response to the alert signal, a remote service professional may assemble a new ACM that can be subsequently transferred from the remote server.

In some embodiments, 320 further includes calculating an identification key from the assigned ACM. For instance, the identification key may represent a new character string or sequence that reduces or compresses the size of the character sequence of the ACM. Optionally, the calculation may be made according to a cyclic redundancy check algorithm, a cryptographic hash function, or another suitable operation.

At 330, the method 300 includes determining a service action based on the ACM. Therefore, the determination at 330 may be contingent upon (e.g., a function of) what the ACM is at 320. Optionally, 330 may include selecting one or more service actions from a plurality of preset service actions (e.g., stored within the diagnostic tool). Each service action of the plurality of preset service actions may be correlated to one or more unique appliance configuration manifests. Thus, a certain ACM may prompt a certain correlated service action. In embodiments wherein an identification key is calculated, the service actions may be similarly correlated to different identification keys.

At 340, the method 300 includes initiating the determined service action of 330. In particular, the determined service action may be initiated at the diagnostic tool. For instance, the diagnostic tool may initiate the determined service action in direct response to the determination at 330.

In some embodiments, the service action is presentation of a graphical user interface (GUI) on the display of the diagnostic tool. Multiple GUIs may be provided and may correspond to one or more different ACMs. Some discrete ACMs may cause a different discrete GUI to be presented. Other discrete ACMs may cause the same GUI to be presented. As an example, some refrigerator appliances (e.g., models) may prompt presentation of different discrete GUIs, while other refrigerator appliances (e.g., models) may prompt presentation of the same GUI. In some such embodiments, one or more suitable parsing algorithms may be executed based on the presented GUI.

In additional or alternative embodiments, the service action is collecting a recorded log data set from the control board(s) of the consumer appliance. Different consumer appliances (e.g., different models of a specific consumer appliance, different types of consumer appliances, etc.) may record different data or information during operation. Thus, it may be advantageous for the diagnostic tool to only attempt the collection of relevant information (e.g., class of information, such as temperature history, activation/deactivation history, etc.). Some discrete ACMs may cause a different discrete log data set to be collected. Other discrete ACMs may cause the same log data set to be collected. As an example, some refrigerator appliances (e.g., models) may prompt the collection of a certain log data set (e.g., temperature history), while other refrigerator appliances (e.g., models) may prompt the collection of the same log data set. As another example, some refrigerator appliances (e.g., models) may prompt the collection of a certain log data set (e.g., temperature history), while other refrigerator appliances (e.g., models) may prompt the collection of another log data set (e.g., activation/deactivation history for a compressor of the refrigerator appliance).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of servicing a consumer appliance, the method comprising:
   receiving non-functional character data from a control board of the consumer appliance at a diagnostic tool connected to the control board and external to the control board;
   assigning an appliance configuration manifest to the consumer appliance based on the received non-functional character data, the appliance configuration manifest being an identifier of the consumer appliance;
   determining a service action based on the appliance configuration manifest;
   calculating an identification key from the appliance configuration manifest; and
   initiating the determined service action at the diagnostic tool,
   wherein assigning occurs at a controller of the diagnostic tool,
   wherein the non-functional character data comprises a control board address, a hardware identifier, an image identifier, software version information, parametric version information, or personality configuration information,
   wherein the service action comprises collecting a recorded log data set from the control board,
   wherein determining the service action comprises selecting the service action from a plurality of preset service actions, and
   wherein each service action of the plurality of preset service actions is correlated to one or more unique appliance configuration manifests and the identification key.

2. The method of claim 1, wherein the service action comprises presentation of a graphical user interface on a display of the diagnostic tool.

3. The method of claim 1, wherein the non-functional character data comprises component identification information of the control board.

4. The method of claim 1, wherein the appliance configuration manifest is one of a plurality of predetermined appliance configuration manifests.

5. A diagnostic tool for a consumer appliance having a control board, the diagnostic tool comprising:
   a casing spaced apart from the consumer appliance; and
   a controller mounted within the casing, the controller being connected to the control board of the consumer appliance and external to the control board, the controller being configured to direct a service operation, the service operation comprising:
   receiving non-functional character data from the control board of the consumer appliance at the diagnostic tool,
   assigning an appliance configuration manifest to the consumer appliance based on the received non-functional character data, the appliance configuration manifest being an identifier of the consumer appliance,
   determining a service action based on the appliance configuration manifest,
   calculating an identification key from the appliance configuration manifest, and
   initiating the determined service action at the diagnostic tool,
   wherein assigning occurs at the controller on the diagnostic tool,
   wherein the non-functional character data comprises a control board address, a hardware identifier, an image identifier, software version information, parametric version information, or personality configuration information,
   wherein the service action comprises collecting a recorded log data set from the control board,
   wherein determining the service action comprises selecting the service action from a plurality of preset service actions, and
   wherein each service action of the plurality of preset service actions is correlated to one or more unique appliance configuration manifests and the identification key.

6. The diagnostic tool of claim 5, wherein the service action comprises presentation of a graphical user interface on a display of the diagnostic tool.

7. The diagnostic tool of claim 5, wherein the service action comprises collecting a recorded log data set from the control board.

8. The diagnostic tool of claim 5, wherein the non-functional character data comprises component identification information of the control board.

9. The diagnostic tool of claim 5, wherein the appliance configuration manifest is one of a plurality of predetermined appliance configuration manifests.

10. A method of servicing a consumer appliance, the method comprising:
    receiving non-functional character data from a control board of the consumer appliance at a diagnostic tool connected to the control board and external to the control board;

assigning an appliance configuration manifest to the consumer appliance based on the received non-functional character data, the appliance configuration manifest being an identifier of the consumer appliance that is not stored on the control board;

determining a service action at the diagnostic tool based on the appliance configuration manifest;

calculating an identification key from the appliance configuration manifest; and initiating the determined service action at the diagnostic tool, wherein assigning occurs at a controller of the diagnostic tool, wherein the non-functional character data comprises a control board address, a hardware identifier, an image identifier, software version information, parametric version information, or personality configuration information, wherein the service action comprises collecting a recorded log data set from the control board, wherein determining the service action comprises selecting the service action from a plurality of preset service actions, and wherein each service action of the plurality of preset service actions is correlated to one or more unique appliance configuration manifests and the identification key.

11. The method of claim 10, wherein the service action comprises presentation of a graphical user interface on a display of the diagnostic tool.

12. The method of claim 10, wherein the non-functional character data comprises component identification information of the control board.

13. The method of claim 10, wherein the appliance configuration manifest is one of a plurality of predetermined appliance configuration manifests.

* * * * *